G. H. ROBICHON.
DIARY.
APPLICATION FILED MAR. 23, 1918.

1,299,782.

Patented Apr. 8, 1919.

INVENTOR
G.H. ROBICHON

BY

E.W. Bond

ATTY

UNITED STATES PATENT OFFICE.

GEORGES HENRI ROBICHON, OF THREE RIVERS, QUEBEC, CANADA.

DIARY.

1,299,782.       Specification of Letters Patent.       Patented Apr. 8, 1919.

Original application filed November 24, 1916, Serial No. 133,237. Divided and this application filed March 23, 1918. Serial No. 224,400½.

*To all whom it may concern:*

Be it known that I, GEORGES HENRI ROBICHON, a subject of the King of Great Britain, and resident of the city of Three Rivers, in the Province of Quebec, Dominion of Canada, have invented certain new and useful Improvements in Diaries, of which the following is a specification.

This invention relates to improvements in diaries, and the objects of the invention are to enable a record of past, present or future happenings, or matters which are to be attended to in the future, or a record of matters which occur from day to day to be readily recorded in a minimum amount of space and in such a way that the matters to be attended to or which have happened on a given day may be readily selected by reason of their being alined in a single column under a given number indexing a day or like subdivision of time, and it consists essentially of the improved arrangement of sheets and rulings hereinafter described in detail in the accompanying specification and drawings.

This present application is a division of my application Serial No. 133,237, filed Nov. 24, 1916.

In the drawings have been shown the preferred forms of the invention, it being, however, understood that no limitation is necessarily made to the precise structural details herein exhibited, but the right is hereby reserved to any changes, alterations or modifications that come within the scope of the appended claim without departing from the spirit of the invention or sacrificing the efficiency of the same.

The drawings shows a plan view of the diary.

The drawing shows a diary of current happenings or happenings to be performed in the future of each day of each month. There are twelve sheets representing each month of the year, and having lateral tabs *a* with designating marks *b* thereon. Each sheet as herein shown is ruled so as to present horizontal lines, as well as vertical columns *c* which are numbered from one to thirty-one inclusive, and providing an unnumbered column *d* preceding the first vertical column indicated by a numeral. The broad column *e* at the left hand side of the sheets is to be used to provide space for compiling these sheets in a loose leaf binder. Each sheet may have attached thereto, a tab designating the month of the year; it is also here understood that the same may be placed within a bound book.

In keeping this diary I have shown illustrations, how happenings whether past or to be performed in the future may appear. For example, on the 2nd day of January I boarded the train at 8.30 a. m. at Montreal for Quebec, and at 12.00 p. m. I boarded the train at Quebec for Ottawa. In this manner, the present or past happenings may be recorded.

For recording matters to be attended to in the near future, such as on the 26th day of January, furniture insurance is due, and a note of a hundred dollars ($100.00) should be paid at the Bank of Montreal. The first letter of each sentence of the data to be recorded will begin in the vertical column designated by the day of the month in which such matter to be recorded, is opened or to be performed. In writing on the same horizontal line for one or more different matters, a space of one or two columns must be left between each subject matter, and if the matter recorded requires more than one horizontal line, it must be continued on the next horizontal line for beginning the next line on the unnumbered column preceding the first vertical column indicated by a numeral, so that in referring to the diary it will not appear that this matter happened on the 1st of the month instead of another date. In referring back to what happened on the 2nd of January for example, the January sheet of the diary will be referred to in looking down the vertical column being designated by the numeral 2, one may refer back or make note of just what has happened and is to happen on that day.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A diary comprising a plurality of sheets each having at one vertical edge a tab with means indicating the month, said sheet being ruled horizontally and vertically with the vertical columns numbered consecutively to indicate the days of the month, with a blank vertical column at the right of the numbered columns, an unnumbered vertical column preceding the first vertical numbered column, and a broad blank column at the left of said unnumbered vertical column.

In witness whereof I have hereunto set my hand in the presence of a witness.

GEORGES HENRI ROBICHON.

Witness:
RUSELL B. SMART.